S. W. CHESNUTT.
SWIVEL CASTER.
APPLICATION FILED MAR. 15, 1920.
1,341,630. Patented June 1, 1920.
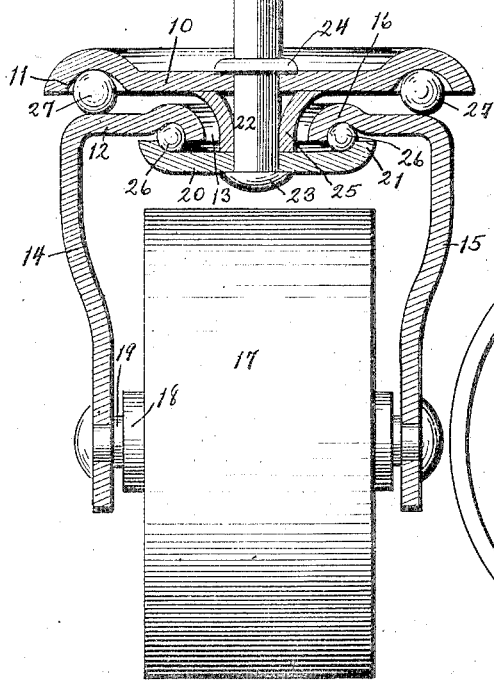
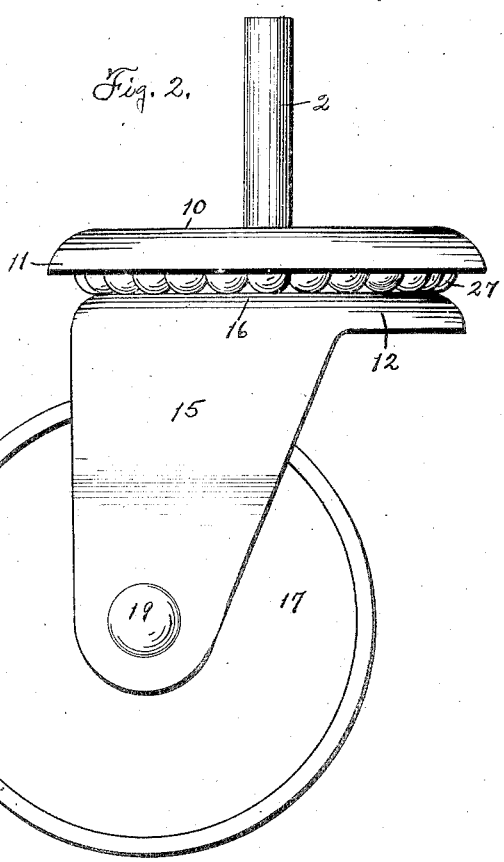
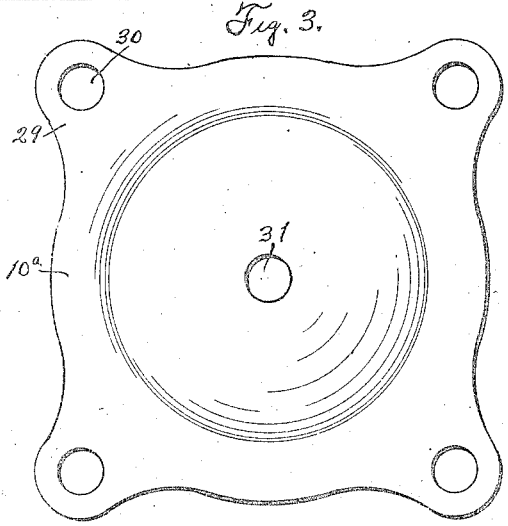
INVENTOR:
S. W. CHESNUTT
By Earl M. Sinclair
Atty.

UNITED STATES PATENT OFFICE.

SEIBERT W. CHESNUTT, OF KANSAS CITY, MISSOURI.

SWIVEL-CASTER.

1,341,630. Specification of Letters Patent. Patented June 1, 1920.

Application filed March 15, 1920. Serial No. 365,815.

*To all whom it may concern:*

Be it known that I, SEIBERT W. CHESNUTT, a citizen of the United States of America, and resident of Kansas City, Jackson county, Missouri, have invented a new and useful Swivel-Caster, of which the following is a specification.

The object of this invention is to provide an improved construction for swivel casters, especially with respect to a relatively small type of caster adapted to be made principally by pressing and stamping and adapted for use on furniture and the like.

A further object of this invention is to provide means for connecting the top plate and wheel yoke of a caster in such manner as to prevent lateral movement of said members.

A further object of this invention is to provide a simple, inexpensive and durable construction for swivel casters.

My invention consists in the construction, arrangement and combination of elements hereinafter set forth, pointed out in the claims and illustrated by the accompanying drawing, in which—

Figure 1 is a vertical section of a swivel caster embodying my invention. Fig. 2 is a side elevation of the same. Fig. 3 is a plan of a top plate of a caster of slightly modified construction. In the construction of the devices as shown in Figs. 1 and 2 the numeral 10 designates a top plate which may be of any suitable size and shape and is formed with an integral annular groove 11 near its periphery, forming a portion of a ball-race on its under surface. The ball-race 11 preferably is formed by pressing and stamping the top plate 10 in such manner that a portion of its substance is carried above the plane of the major portion thereof. A wheel yoke is provided and is formed with a horizontal portion 12 formed with a relatively large circular aperture 13 at its center and also formed with integral downwardly extending wings or flanges 14, 15. The wheel yoke preferably is formed by pressing and stamping and the top plate 12 thereof is so placed as to form a concavo-convex ball-race 16 circumferentially of the central aperture 13. A supporting wheel 17, having a hub 18, is mounted between the wings 14, 15 of the yoke member, and an axle 19 passes through said hub and through the lower portions of said wings, said axle preferably being riveted or upset at its ends outside of said wings. A circular retaining plate 20 is provided and is formed with a hole at its center and with an upwardly pressed peripheral flange 21 at its circumference, thus providing a ball-race on the upper surface of said retaining plate adapted to coact with the ball-race of the wheel yoke. A rivet 22 is mounted through the central hole of the retaining plate 20 and through a registering hole in the center of the top plate 10 and said rivet is formed at its lower end with a head 23 contacting the lower face of said retaining plate and is also formed with a head or shoulder 24 contacting the upper face of said top plate. A collar 25 is mounted on the rivet 22 between the retaining plate 20 and top plate 10, thus serving to space said plates apart a suitable distance; and said plates are drawn and held tightly and rigidly against the opposite ends of said collar in such manner as to prevent relative movement of said plates. At its lower end the collar 25 fits snugly to the rivet 22 but flares outwardly toward its upper end away from said rivet, thus presenting a relatively wide bearing surface in contact with the top plate 10. Bearing balls 26 are mounted between the race 16 of the wheel yoke and the race formed by the flange 21 of the retaining plate, said flange being extended upwardly and suitable curves outside of the row of bearing balls and the race 16 of the wheel yoke being extended inwardly and downwardly on a suitable curve on the inner side of the row of balls. The row of balls 26 particularly reduce and tend to prevent friction which might be occasioned by relative lateral movement of the wheel carrying member and the load bearing member. A row 27 of bearing balls is mounted in the ball race 11 of the top plate and said balls contact a smooth, plane upper portion or track of the top member 12 of the wheel yoke. The balls 27 particularly tend to lessen and prevent friction occasioned by a load placed upon the device. In the construction according to Figs. 1 and 2 the rivet 22 is formed with an integral upwardly extending stem 28 adapted to be received within a suitable socket of an article to which the caster is to be attached.

In the construction according to Fig. 3 the stem 28 is omitted, the rivet not extending above the upper head or shoulder 24ᵃ. The top plate 10ᵃ is formed with a plurality of integral spaced ears 29 which are formed each with an aperture 30 adapted to receive a bolt or screw by means of which the device may be attached to an article to be supported.

This construction provides a simple, durable and efficient caster of the smaller type such as is used on furniture and the like and a caster which can be made very inexpensively by pressing and stamping. The double row of bearing balls, which it will be noted are arranged in different horizontal planes, reduce friction to a minimum and the arrangement of the innermost and lowermost row 26 of balls, in relation to the ball races of the wheel yoke and retaining member, together with the provision of the collar held rigidly between the retaining member and top plate, tend to provide absolute rigidity and durability and to prevent relative lateral motion of the parts. This construction provides a caster with frictionless swiveling qualities and one which is particularly efficient in traveling over rough surfaces or where lateral strain is involved.

I claim as my invention—

1. A swivel caster, comprising a substantially plane top plate formed with an annular ball race in its lower surface, a wheel yoke having a substantially horizontal member arranged beneath said top plate and downwardly extending wings between which a wheel is rotatably mounted, bearing balls in the ball race of said top plate contacting the upper surface of the horizontal portion of said wheel yoke, the horizontal portion of said wheel yoke being formed with an annular ball race in its lower surface, a retaining member mounted beneath the horizontal portion of said wheel yoke, bearing balls mounted in the ball race of said wheel yoke and contacting the upper surface of said retaining member, and means for securing said retaining member to said top plate.

2. A swivel caster, comprising a top plate formed with an annular ball race in its lower surface, a wheel yoke having a substantially horizontal member arranged beneath said top plate and downwardly extending wings between which a wheel is rotatably mounted, bearing balls in the ball race of said top plate contacting the upper surface of the horizontal portion of said wheel yoke, the horizontal portion of said wheel yoke being formed with an annular ball race in its lower surface, a retaining member mounted beneath the horizontal portion of said wheel yoke, bearing balls mounted in the ball race of said wheel yoke and contacting the upper surface of said retaining member, said retaining member being substantially plane and being formed with an upstanding peripheral flange located outside of the last named row of balls, and means for securing said retaining member to said top plate.

3. A swivel caster, comprising a top plate formed with an annular ball race in its lower surface, a wheel yoke having a substantially horizontal member arranged beneath said top plate and downwardly extending wings between which a wheel is rotatably mounted, bearing balls in the ball race of said top plate contacting the upper surface of the horizontal portion of said wheel yoke, the horizontal portion of said wheel yoke being formed with an annular ball race in its lower surface, a retaining member mounted beneath the horizontal portion of said wheel yoke, bearing balls mounted in the ball race of said wheel yoke and contacting the upper surface of said retaining member, a collar mounted between and serving to space apart the top plate and retaining member, and means for securing said retaining plate to said top plate, said securing means serving to draw and hold said retaining member and top plate rigidly against said collar.

4. A swivel caster, comprising a top plate formed with an annular ball race in its lower surface, a wheel yoke having a substantially horizontal member arranged beneath said top plate and downwardly extending wings between which a wheel is rotatably mounted, bearing balls in the ball race of said top plate contacting the upper surface of the horizontal portion of said wheel yoke, the horizontal portion of said wheel yoke being formed with an annular ball race in its lower surface, a retaining member mounted beneath the horizontal portion of said wheel yoke, bearing balls mounted in the ball race of said wheel yoke and contacting the upper surface of said retaining member, a collar mounted between and serving to space apart the top plate and retaining member, means for securing said retaining member to said top plate, said retaining member being formed with an upstanding peripheral flange located outside of the last named row of balls, said securing member passing through said collar and serving to hold said retaining member and top plate tightly against opposite ends thereof, said collar fitting closely at the lower end to said securing member and flaring away from said securing member at its upper end.

5. A swivel caster comprising a wheel yoke having a horizontal portion and downwardly extending flanges between which a wheel is mounted for rotation, said horizontal portion being formed with a relatively large central aperture and a ball race in its lower surface circumferentially of said aperture, a top plate formed with an annular ball race in its lower surface, bearing balls mounted in the latter ball race and contacting the plane upper surface of the horizontal surface of the wheel yoke, a retaining member mounted beneath the horizontal portion of the wheel yoke and formed with a ball race in its upper surface, bearing balls mounted in the last named ball race and engaging the ball race of the wheel yoke, a spacing member mounted in the aperture of the horizontal portion of the wheel yoke and between the retaining member and the top plate, and a securing member extending through said spacing member and through central portions of the retaining member and top plate and formed with abutments contacting the outer surfaces of said member and plate.

6. A swivel caster comprising a wheel yoke having a horizontal portion and downwardly extending flanges between which a wheel is mounted for rotation, said horizontal portion being formed with a relatively large central aperture and a ball race in its lower surface circumferentially of said aperture, a top plate formed with an annular ball race in its lower surface, bearing balls mounted in the latter ball race and contacting the plane upper surface of the horizontal surface of the wheel yoke, a retaining member mounted beneath the horizontal portion of the wheel yoke and formed with a ball race in its upper surface, bearing balls mounted in the last named ball race and engaging the ball race of the wheel yoke, a spacing member mounted in the aperture of the horizontal portion of the wheel yoke and between the retaining member and top plate, a securing member extending through said spacing member and through central portions of the retaining member and top plate and formed with abutments contacting the outer surfaces of said member and plate, said spacing member being spaced from the ball race of the horizontal portion of the wheel yoke.

Signed at Kansas City, in the county of Jackson and State of Missouri, this 3d day of March, 1920.

SEIBERT W. CHESNUTT.